United States Patent
Andrew

(10) Patent No.: US 6,999,626 B2
(45) Date of Patent: Feb. 14, 2006

(54) MEMORY MANAGEMENT OF COMPRESSED IMAGE DATA

(75) Inventor: James Philip Andrew, Waverton (AU)

(73) Assignee: Canon Kabushiki Kaisha, Tokyo (JP)

( * ) Notice: Subject to any disclaimer, the term of this patent is extended or adjusted under 35 U.S.C. 154(b) by 781 days.

(21) Appl. No.: 09/791,592

(22) Filed: Feb. 26, 2001

(65) Prior Publication Data

US 2001/0021223 A1 Sep. 13, 2001

(30) Foreign Application Priority Data

Mar. 13, 2000 (AU) .............................................. PQ6185

(51) Int. Cl.
*G06K 9/46* (2006.01)

(52) U.S. Cl. ....................... 382/235; 382/244; 382/252; 382/305; 709/247; 707/101; 708/203

(58) Field of Classification Search ................. 382/235, 382/240, 243, 222, 305, 239, 244, 252, 275; 345/535, 543, 555, 566; 348/73, 174, 231.9; 709/247; 707/101; 708/203

See application file for complete search history.

(56) References Cited

U.S. PATENT DOCUMENTS

| | | | |
|---|---|---|---|
| 5,164,831 A | * 11/1992 | Kuchta et al. ........... 348/231.7 |
| 5,381,145 A | 1/1995 | Allen et al. ................. 341/107 |
| 5,402,170 A | * 3/1995 | Parulski et al. .......... 348/211.6 |
| 5,432,893 A | * 7/1995 | Blasubramanian et al. . 345/600 |
| 5,471,206 A | 11/1995 | Allen et al. .................... 341/51 |
| 5,583,500 A | 12/1996 | Allen et al. ................. 341/107 |
| 5,717,394 A | 2/1998 | Schwartz et al. ............. 341/51 |
| 5,724,070 A | * 3/1998 | Denninghoff et al. ....... 345/547 |
| 5,748,786 A | 5/1998 | Zandi et al. ................. 382/240 |
| 5,815,097 A | 9/1998 | Schwartz et al. ............. 341/51 |
| 5,838,834 A | 11/1998 | Saito ......................... 382/25.1 |
| 5,867,602 A | 2/1999 | Zandi et al. ................. 382/248 |

(Continued)

FOREIGN PATENT DOCUMENTS

| | | |
|---|---|---|
| AU | 708444 | 4/1999 |
| AU | 719749 | 4/1999 |
| AU | 744914 | 1/2001 |
| EP | 0892557 A1 | 1/1999 |
| EP | 0944263 A1 | 9/1999 |
| JP | 10-145737 | 5/1998 |
| WO | WO 98/11728 A | 3/1998 |

OTHER PUBLICATIONS

M. Charrier, et al., "JPEG2000, The Next Millennium Compression Standard for Still Images", IEEE Comput. Soc, US, Jun. 7, 1999, PP. 131–132.

"JPEG 2000 Image Coding System"; Committee Draft Version 1.0, Dec. 9, 1999; pp. 1–164.

Andrew Bruce et al., "Wavelet Analysis", The Institute Of Electrical And Electronics Engineers, Inc., 1996; 9 pages.

*Primary Examiner*—Bhavesh M. Mehta
*Assistant Examiner*—Yosef Kassa
(74) *Attorney, Agent, or Firm*—Fitzpatrick, Cella, Harper & Scinto

(57) ABSTRACT

A method is disclosed for recovering image memory capacity, in relation to an image which has been encoded using a linear transform according to a layer progressive mode into L layers, L being an integer value greater than unity, the L layers being stored in an image memory having a limited capacity. The method comprises defining a Quality Reduction Factor (700), being a positive integer value, identifying at least one of the L layers corresponding to the Quality Reduction Factor, and discarding (702) said at least one of the L layers in progressive order in accordance with the Quality Reduction Factor, thereby recovering said memory capacity.

48 Claims, 9 Drawing Sheets

U.S. PATENT DOCUMENTS

| | | | |
|---|---|---|---|
| 5,881,176 A | 3/1999 | Keith et al. | 382/248 |
| 5,966,465 A | 10/1999 | Keith et al. | 382/232 |
| 6,028,961 A | 2/2000 | Shimomura | 382/239 |
| 6,175,517 B1 * | 1/2001 | Jigour et al. | 365/63 |
| 6,195,465 B1 | 2/2001 | Zandi et al. | 382/248 |
| 6,212,301 B1 * | 4/2001 | Warner et al. | 382/232 |
| 6,222,941 B1 | 4/2001 | Zandi et al. | 382/232 |
| 6,246,797 B1 | 6/2001 | Castor et al. | 382/232 |
| 6,246,798 B1 | 6/2001 | Andrew et al. | 382/240 |
| 6,374,039 B1 * | 4/2002 | Hori et al. | 386/117 |
| 6,429,896 B1 * | 8/2002 | Aruga et al. | 348/231.99 |
| 6,539,169 B1 * | 3/2003 | Tsubaki et al. | 386/109 |
| 6,549,307 B1 * | 4/2003 | Makishima et al. | 348/333.11 |

\* cited by examiner

US 6,999,626 B2

MEMORY MANAGEMENT OF COMPRESSED IMAGE DATA

TECHNICAL FIELD OF THE INVENTION

The present invention relates generally to image compression and, in particular, to memory management in digital cameras. The present invention relates to a method and apparatus for recovering memory capacity in a digital camera.

BACKGROUND ART

Digital cameras typically store captured images digitally, and generally perform storage using a compressed form of the image, where a degree of compression is selected in order to trade-off storage capacity against reconstructed image quality. Traditionally, images are compressed on the camera using the Joint Photographic Expert Group (JPEG) still image compression standard. A quality setting is typically selected prior to capturing the image. Higher quality settings result in relatively higher reconstructed image quality, at the cost of higher consumption of storage space. Conversely lower quality settings require less storage space for the image, but result in lower reconstructed image quality. Therefore, low quality images require less storage space, allowing more low quality images to be stored on a memory device in the camera. Accordingly, there is a trade-off between image quality and a maximum number of images which can be simultaneously stored on the memory device in the camera.

FIG. 1 shows a prior art digital camera process flow, indicating how quality selection is an encode-time choice, which is made before the image is taken. The figure depicts a discrete image capture process 108 whereby a quality parameter is selected in a step 100. Thereafter, an image capture step 102, is followed by an image compression and storage step 104. The image capture process 108 is thereafter directed in accordance with an arrow 106 back to the quality parameter selection step 100. An initial choice of low quality cannot be reversed after the image has been taken, and accordingly a digital camera user may be inclined to use high quality more often than not. This however results in rapid exhaustion of on-board image storage capacity.

Some traditional applications using digital images, for example digital printing, have reduced the size of digital image files, which have been compressed at a particular quality, by first decompressing, and then re-compressing the image again at a lower quality. This is, however, a slow and computation intensive approach, not suitable for use in portable electronic equipment such as digital cameras. Furthermore, decompression and subsequent recompression introduces other problems such as loss of quality.

DISCLOSURE OF THE INVENTION

It is an object of the present invention to substantially overcome, or at least ameliorate, one or more disadvantages of existing arrangements.

According to a first aspect of the invention, there is provided a method of recovering image memory capacity, in relation to an image which has been encoded according to a layer progressive mode into L layers, L being an integer value greater than unity, the L layers being stored in an image memory having a limited capacity; said method comprising steps of:

defining a Quality Reduction Factor;

identifying at least one of the L layers corresponding to the Quality Reduction Factor; and discarding said at least one of the L layers in progressive order in accordance with the Quality Reduction Factor, thereby recovering said memory capacity.

According to another aspect of the invention, there is provided a method of recovering image memory capacity, in relation to an image which has been encoded according to a resolution progressive mode into R resolution levels, the R resolution levels being stored in an image memory having a limited capacity; the method comprising steps of:

defining a Resolution Reduction Factor, being a positive integer value;

identifying at least one of the resolution levels, corresponding to the Resolution Reduction Factor; and discarding said at least one of the resolution levels in progressive order, in accordance with the Resolution Reduction Factor, thereby recovering the memory capacity.

According to another aspect of the invention, there is provided a method of recovering image memory capacity, in relation to an image which has been encoded to produce a plurality of corresponding encoded image elements arranged in a progressive order, said encoded image elements being stored in an image memory having a limited capacity, said method comprising the steps of:

defining a reduction factor identifying at least one of said encoded image elements corresponding to said reduction factor; and discarding said at least one encoded image element in said progressive order, thereby recovering said memory capacity.

According to another aspect of the invention, there is provided an apparatus for recovering image memory capacity, in relation to an image which has been encoded according to a layer progressive mode into L layers, L being an integer value greater than unity, the L layers being stored in an image memory having a limited capacity; said apparatus comprising:

Quality Reduction Defining means for defining a Quality Reduction Factor;

identifying means for identifying at least one of the L layers corresponding to the Quality Reduction Factor; and discarding means for discarding said at least one of the L layers in the progressive order in accordance with the Quality Reduction Factor, thereby recovering said memory capacity.

According to another aspect of the invention, there is provided an apparatus for recovering image memory capacity, in relation to an image which has been encoded according to a resolution progressive mode into R resolution levels, R being an integer value greater than unity, the R resolution levels being stored in an image memory having a limited capacity; the apparatus comprising:

Resolution Reduction Factor defining means for defining a Resolution Reduction Factor;

identifying means for identifying at least one of the resolution levels, corresponding to the Resolution Reduction Factor; and discarding means for discarding said at least one of the resolution levels in a progressive order, in accordance with the Resolution Reduction Factor, thereby recovering the memory capacity.

According to another aspect of the invention, there is provided an apparatus for recovering image memory capacity, in relation to an image which has been encoded to produce a plurality of corresponding encoded image elements arranged in a progressive order, said encoded image elements being stored in an image memory having a limited capacity, said apparatus comprising:

defining means for defining a reduction factor identifying means for identifying at least one of said encoded image elements corresponding to said reduction factor; and discarding means for discarding said at least one encoded image element in said progressive order, thereby recovering said memory capacity.

According to another aspect of the invention, there is provided a computer readable memory medium for storing a program for apparatus for recovering image memory capacity, in relation to an image which has been encoded according to a layer progressive mode into L layers, L being an integer value greater than unity, the L layers being stored in an image memory having a limited capacity; said program comprising:

code for a defining step for defining a Quality Reduction Factor;

code for an identifying step for identifying at least one of the L layers corresponding to the Quality Reduction Factor; and code for a discarding step for discarding said at least one of the L layers in progressive order in accordance with the Quality Reduction Factor, thereby recovering said memory capacity.

According to another aspect of the invention, there is provided a computer readable memory medium for storing a program for apparatus for recovering image memory capacity, in relation to an image which has been encoded according to a resolution progressive mode into R resolution levels, R being an integer value greater than unity, the R resolution levels being stored in an image memory having a limited capacity; the program comprising:

code for a defining step for defining a Resolution Reduction Factor;

code for an identifying step for identifying at least one of the resolution levels, corresponding to the Resolution Reduction Factor; and code for a discarding step for discarding said at least one of the resolution levels in progressive order, in accordance with the Resolution Reduction Factor, thereby recovering the memory capacity.

According to another aspect of the invention, there is provided a computer readable memory medium for storing a program for apparatus for recovering image memory capacity, in relation to an image which has been encoded to produce a plurality of corresponding encoded image elements arranged in a progressive order, said encoded image elements being stored in an image memory having a limited capacity, said program comprising:

code for a defining step for defining a reduction factor;

code for an identifying step for identifying at least one of said encoded image elements corresponding to said reduction factor; and code for a discarding step for discarding said at least one encoded image element in said progressive order, thereby recovering said memory capacity.

BRIEF DESCRIPTION OF THE DRAWINGS

A number of preferred embodiments of the present invention will now be described with reference to the drawings, in which.

DETAILED DESCRIPTION INCLUDING BEST MODE

Figure 1:
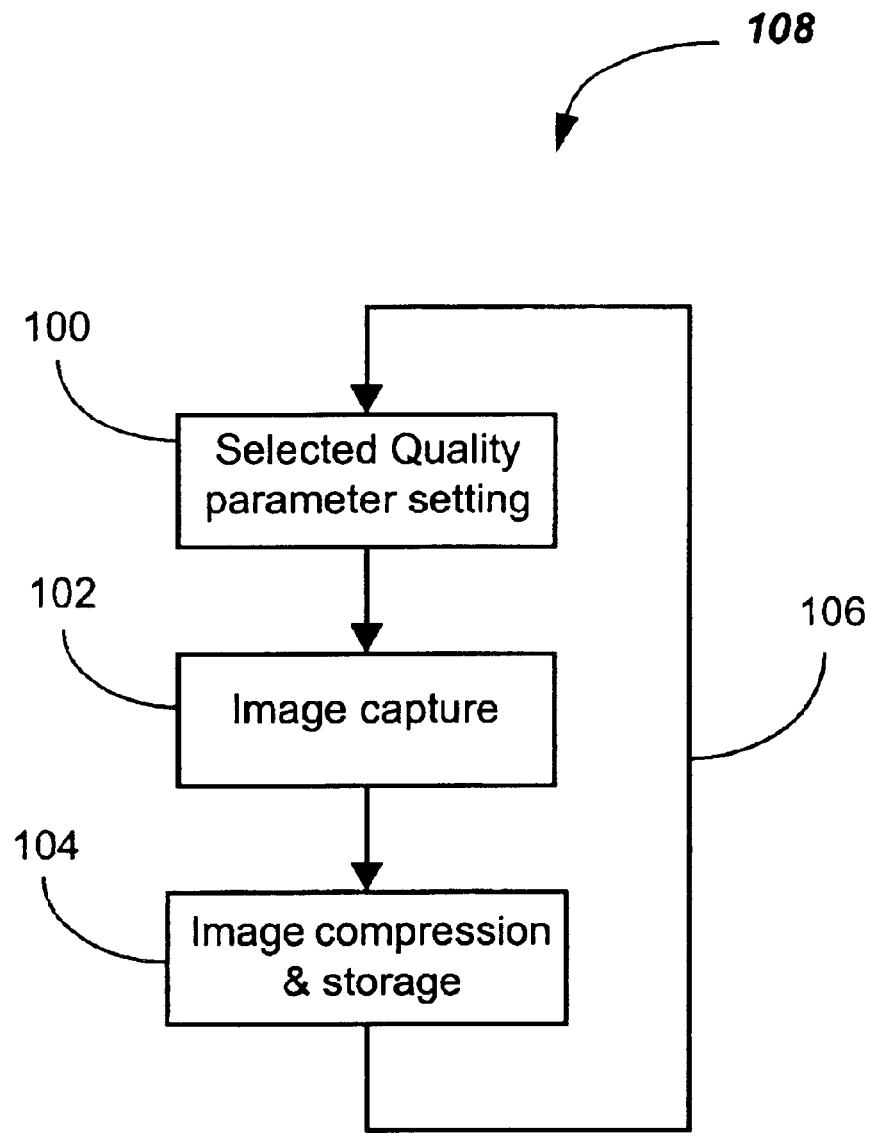
FIG. 1 depicts a process flow for a prior art digital camera arrangement.

Where reference is made in any one or more of the accompanying drawings to steps and/or features, which have the same reference numerals, those steps and/or features have for the purposes of this description the same function(s) or operation(s), unless the contrary intention appears.

Various terms of art have been used in this specification, typically being placed in quotation marks on their first occurrence. Examples of such terms include "image tile", "tile component", "coding passes", "packet", "tile-part", and "progression order". The various terms have been defined in the body of the specification, however in many instances, the reader can refer to the "JPEG 2000 Committee Draft, v1.0, 9 Dec. 1999"" for further details.

Figure 2:
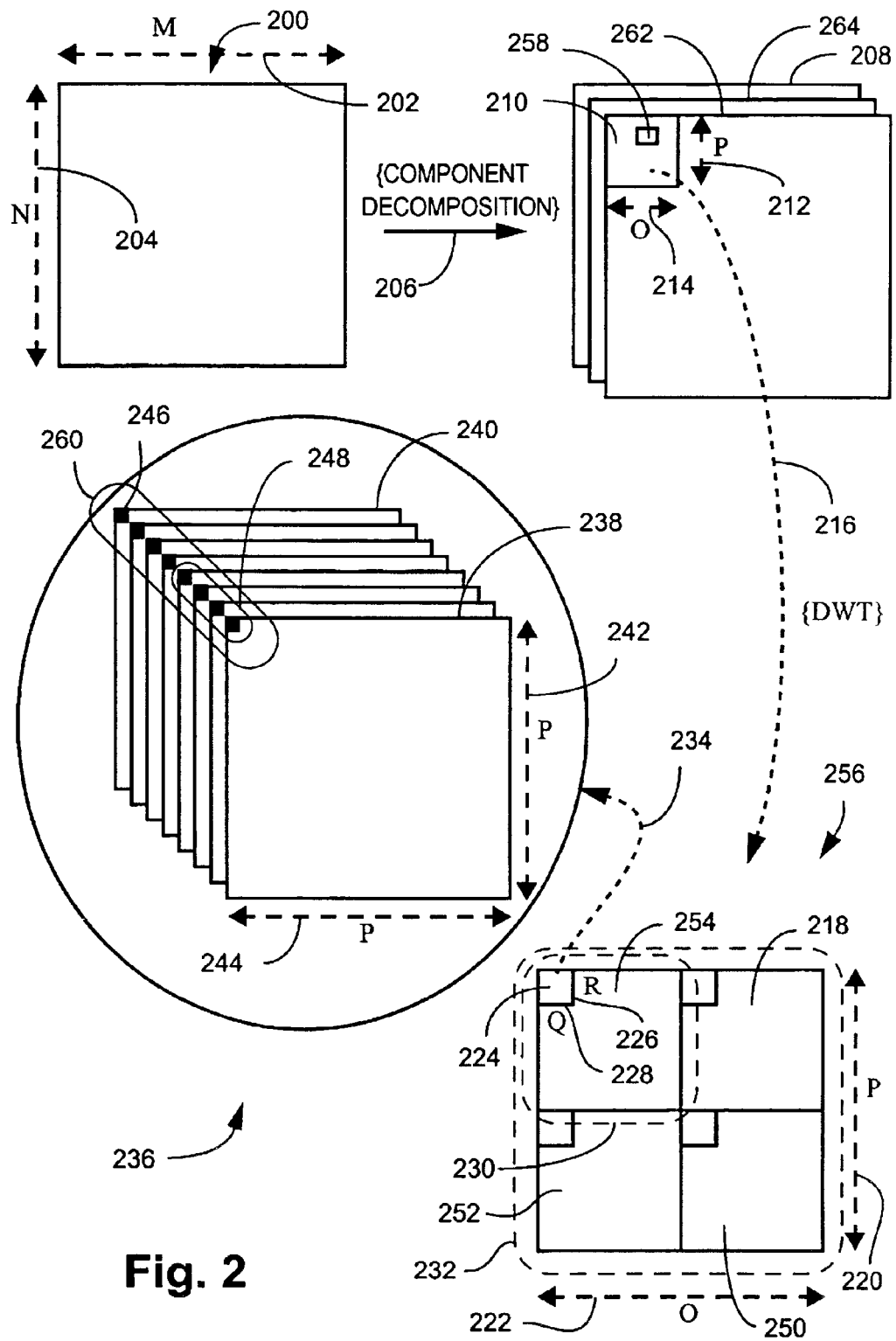
FIG. 2 shows an image encoding scheme in accordance with a preferred embodiment of the invention.

FIG. 2 shows an image encoding scheme in accordance with a preferred embodiment of the invention. The described scheme is largely consistent with the JPEG2000 Image Coding System as described in the "JPEG 2000 Committee Draft Version 1.0, 9 Dec. 1999". An image 200 having a resolution of M pixels wide by N pixels high (designated by reference numerals 202, 204 respectively) can be decomposed, as depicted by an arrow 206, into typically three colour components 208, 264, and 262. Images typically make use of various colour components (eg Red, Green, Blue ie "RGB", or Cyan, Magenta, Yellow ie. "CYN") in different applications. In the present specification, an initial transformation in colour space is accordingly performed, in order to express images in Y, Cb, Cr colour space, since this representation is advantageous when the image is compressed as described later in the specification. Each of the aforementioned colour components is treated independently, and the components 208, 264, and 262 are otherwise treated in an identical fashion.

An "image tile" 210, which is an array of rectangular points, square in the present instance, having a width O pixels wide (ie 214) and a height P pixels (ie 212), is shown on the front image component 262. Tile dimensions can be selected in accordance with hardware constraints or other considerations. This enables encoding of the image 200 to be performed either on the entire image in one process, or alternatively, progressively on a tile by tile basis. A "tile component" 258 is a rectangular sub-component of any size, of which the tile 210 can be composed.

The tile 210 is transformed using a Discrete Wavelet Transform (DWT), as depicted by a dashed arrow 216, to form a transformed image 256, comprising a set of subbands 218, 250, 252, and 254. The transformed image 256 comprises a square array of O coefficients wide (ie 222), and P coefficients high (ie 212). A "code block" 224 is a rectangular grouping of coefficients from the same subband of a tile component, or in the present instance, of the tile 210, is shown on the subband 254. The code block is Q coefficients wide (ie 228), and R coefficients high (ie 226). Q and R can take a value $2^k$, where the exponent is a positive integer k<12. In the preferred embodiment, P and Q have a common value of 32.

An image can be DWT transformed to a desired number of decomposition levels, and there is one more "resolution level" than the number of decomposition levels in a transformed image. Accordingly, FIG. 2 shows a single decomposition level 256, and two resolution levels 230 and 232. Dashed rectangles 230 and 232 depict resolution levels at which image decoding, or reconstruction, can be performed. Reconstructing the image at full resolution (in the present figure shown as resolution 232) reconstructs the image at the same size as the original image tile 210. That is the reconstructed image has the same number of pixels in the horizontal and vertical dimensions as the original image tile 210. Reconstructing at the next lower resolution level (in the present figure shown as 230) reconstructs the image at ½ the size of the original 210 in each dimension. Reconstructing at the yet next lower resolution level (not shown) reconstructs the image at ¼ the size of the original in each dimension and so on.

The code block 224 can be represented in the form of "bit-planes" 238 to 240 as depicted in an inset 236. The bit-planes have the same dimensions P coefficients x Q coefficients (244, 242) as the associated code block 224. Each bit-plane 238 refers to bits of the same magnitude in the respective coefficients in the code block 224. A bit-plane representation 260 of a single coefficient is comprised of individual bit-plane values 246, which can be collected into groups called "layers" eg 248, formed by collecting "coding passes" on the associated code block 224. Individual bit-planes of the coefficients in a code-block are arithmetically coded with three coding passes. Furthermore, parts of individual bit-planes can also be collected into layers, these bit plane parts being termed "sub bit-planes". Selection of appropriate bit-plane partitions when defining layers provides flexibility in achieving desired quality progression when image decompression is performed. The use of sub bit-planes provides an additional fine degree of flexibility in this regard.

Figure 3:
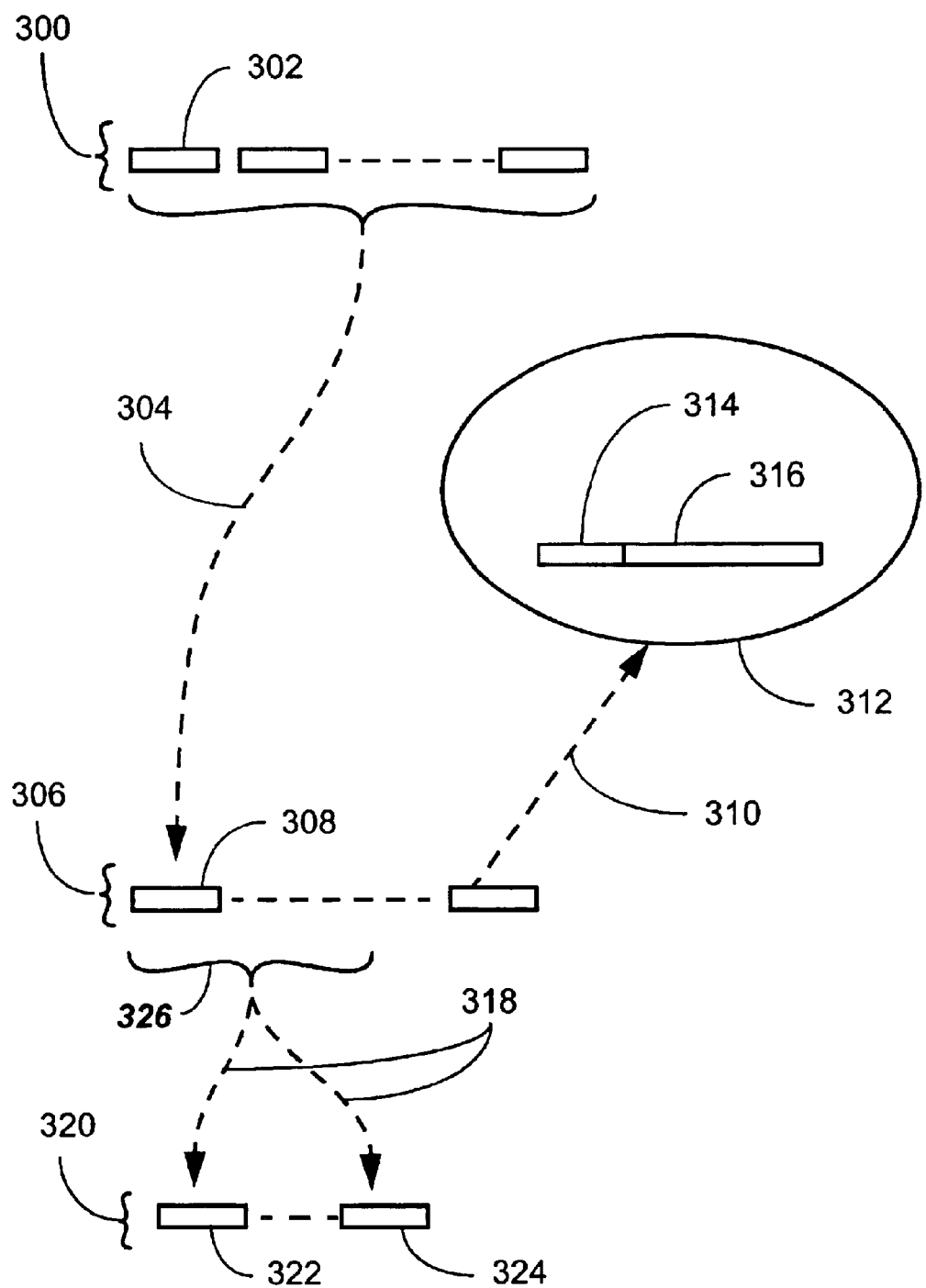
FIG. 3 depicts a data structure ordering format associated with FIG. 2.

FIG. 3 depicts a data structure ordering format associated with FIG. 2, whereby encoded image data is arranged for storage in on-board memory in the digital camera. A layer 300 is composed of a collection of coding passes 302 from one or more code blocks 224 of a tile 210 or tile component 258. The layer 300, or part thereof, is encapsulated, as depicted by a dashed arrow 304, into a "packet" 308. The packet 308, as shown in an inset 312, comprises a packet header 314, and coded data 316 from one layer (eg 300) of one level 256, of one component (eg 262) of a tile 210. A sequence of packets forms part of a "code stream" 306 which includes both encoded image data and overhead information required for decoding and expansion. Packets are a fundamental unit of the compressed code stream. A "tile-part" 320 comprises, as shown by dashed arrows 318, a portion of the code stream 306 which makes up some, or all, of the tile 210. The tile part 320 can include at least one, and up to all, packets making up the tile 210.

Figure 4:
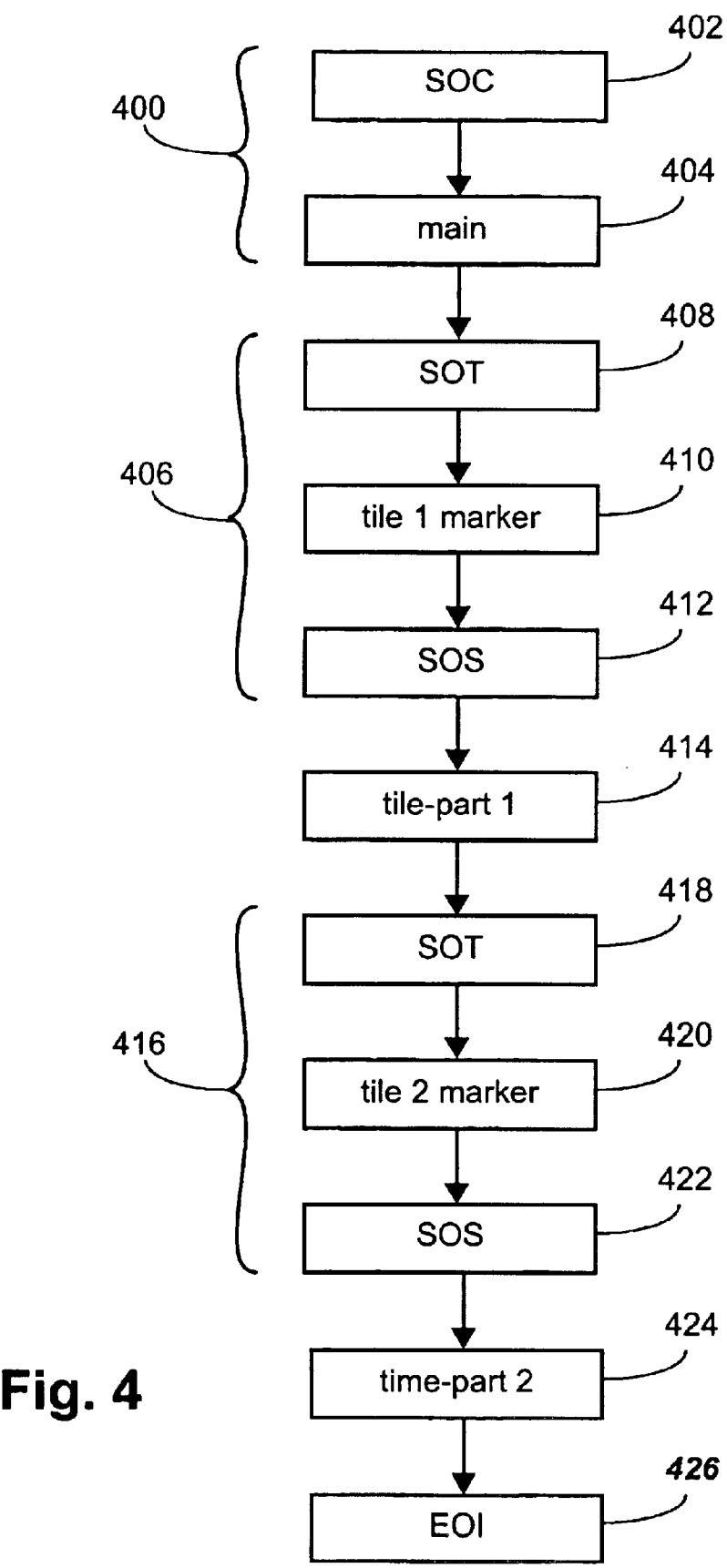
FIG. 4 shows the ordering format of FIG. 3 in more detail.

FIG. 4 shows the data structure ordering format of FIG. 3 in more detail, and in particular, construction of the code stream 306. The segment of code stream depicted starts with a main header 400 comprising an SOC marker 402 which is required as the first marker, and main header marker segments 404. Next follows a tile header 406 comprising an SOT marker 408 which is required at the beginning of each tile-part header, tile-part header marker segments 410, and an SOS marker 412 which is required at the end of each tile-part header. Thereafter, a tile-part bit stream 414 follows, this comprising image data for the tile-part in question. The following tile header 416 both delimits an end of the first tile part data 414, and the start of the next tile-part.

Summarising, an image 200 can be compressed in several layers 300. Each resolution level (230, 232) is coded in the same number of layers as the image 200. Reconstructing the image 200 from a first layer (from all resolution levels) typically results in a low quality version of the original image. Reconstructing from the first and second layers (from all resolution levels) improves the reconstructed image quality compared to using the first layer only. Use of subsequent layers, in addition to previous layers, improves the quality of the reconstructed image yet further. The code stream 306 is progressively arranged so that the information represented by a given image component 262, a given layer 300, and a given resolution level 232 is contained in a contiguous portion of the code stream 306, ie in a packet 308. Typically there is one packet containing the encoded image data for each layer at each resolution level for each component for each tile. The order in which these packets are interleaved is called the "progression order". Thus for an example of 3 image components, 5 resolution levels and 5 layers, where the tile 210 is the size of the image 200, there are typically 75 packets. The packets are sequenced according to the progression order, this being indicated in one of the image header segments. In layer progressive mode, the packets are ordered respectively by image component, resolution and layer. Thus, for example, the packets for all the components and all the resolution levels and the first layer are in the first part of the compressed image bit-stream. Thereafter, the packets for all the components and all the resolution levels for the second layer are in the next part of the compressed image bit-stream, and so on. Thus, for example, if the number of layers is set at 2, the number of resolution levels is set at two, and the number of components is set at 3, the following packet sequence results from the layer progressive mode, where packets are written on separate lines, and the "**********" markers delimit the two layers:

**********************************
LL(Y(layer 1 ))
LL($C_b$(layer 1 ))
LL($C_r$(layer 1 ))
HL(Y(layer 1 )); LH(Y(layer 1 )); HH(Y(layer 1 ));
HL($C_b$(layer 1 )); LH($C_b$(layer 1 )); HH($C_b$(layer1));
HL($C_r$(layer 1 )); LH($C_r$(layer 1 )); HH($C_r$(layer 1 ));
**********************************
LL(Y(layer 2 ))
LL($C_b$(layer 2 ))
LL($C_r$(layer 2 ))
HL(Y(layer 2 )); LH(Y(layer 2 )); HH(Y(layer 2 ));
HL($C_b$(layer 2 )); LH($C_b$(layer 2 )); HH($C_b$(layer 2 ));
HL($C_r$(layer 2 )); LH($C_r$(layer 2 )); HH($C_r$(layer 2 ));
********************************** where: HL($C_r$(layer 2 )), as an example, refers to the HLth subband of the $C_r$ component of the $2^{nd}$ layer. A "progressive" code-stream is to be understood as a code-stream which comprises information elements relating to quality attributes of the image, these elements being linearly, and progressively distributed along the code-stream. This is done in such a manner that if the code-stream is truncated from the trailing end, the particular quality attribute in question will be progressively reduced in a corresponding decoded image. It is thus noted that the code-stream contains information elements linearly distributed in a progressive fashion, earlier information elements relating to higher quality aspects of the image, and later elements relating to lower quality attributes. Accordingly, when reducing a quality attribute, such information elements are discarded in an inverse progressive manner, starting with the least significant and moving towards the most significant information elements as they affect the respective quality attribute.

Image encoding using the scheme described in relation to FIGS. 2, 3, and 4 provides flexibility by which a user can make additional choices in relation to image quality parameters after the image is taken. In fact, as described below, the user is able to further compress images, after they have already been captured and stored in compressed format. The user can exercise this capability with respect to any or all previously captured images, with the extent of further compression being determined on a per-image basis.

Figure 5:
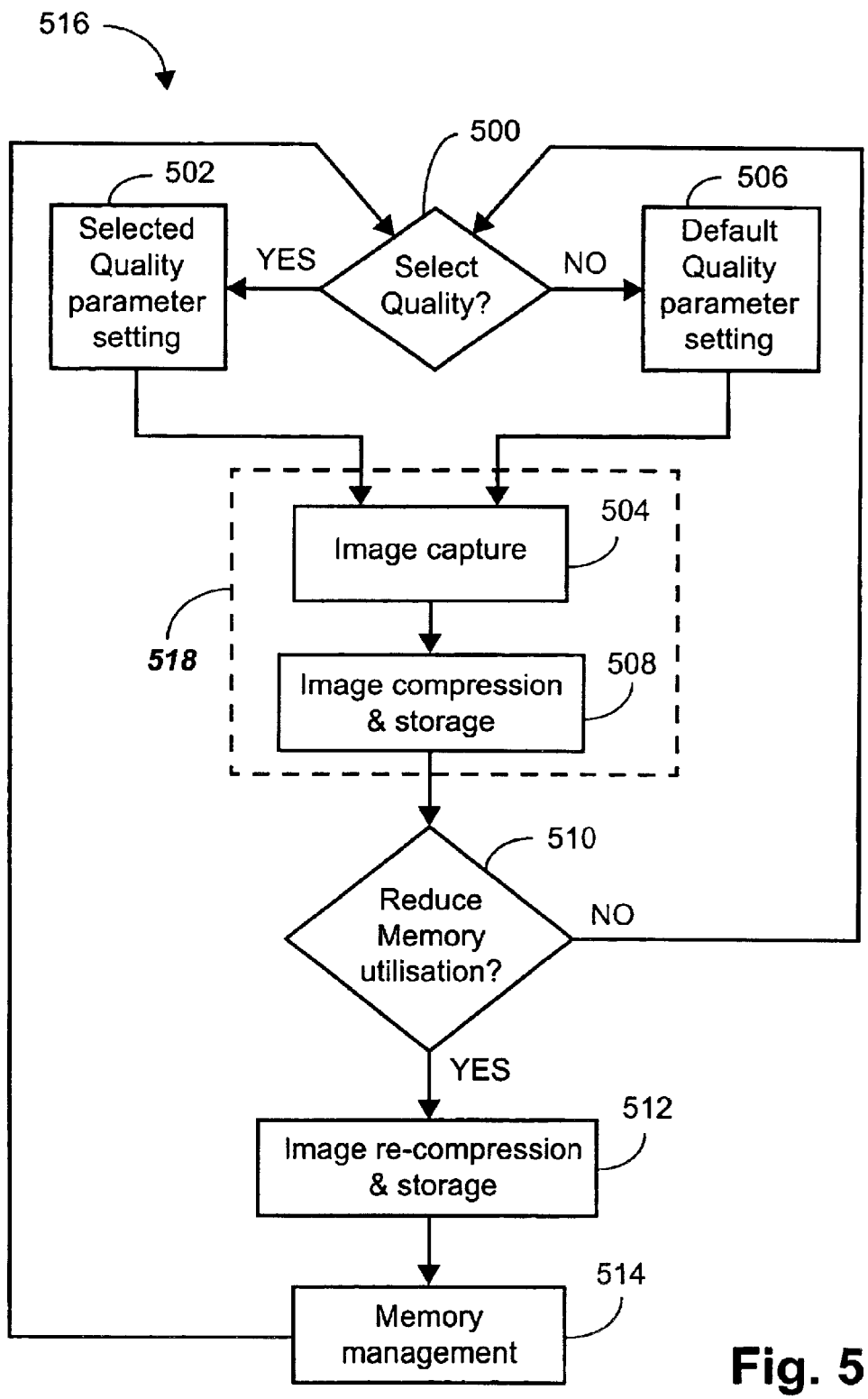
FIG. 5 shows a process flow for a digital camera arrangement in accordance with the preferred embodiment of the invention.

FIG. 5 shows a process flow 516 for a digital camera arrangement in accordance with the preferred embodiment of the invention. In an initial decision step 500, a user can make a quality parameter selection. If this option is elected, the process 516 is directed according to a YES arrow to a quality parameter selection step 502, similar to the step 100 in FIG. 1, where appropriate compression parameters are selected. The process 516 is then directed to an image capture step 504. If the user does not wish to make a quality selection, the process 516 is directed in accordance with a NO arrow to a default setting step 506, and thence to the image capture step 504. The process 516 then proceeds to an image compression and storage step 508. Thereafter, in contrast to traditional camera options, the user is provided with an option in a decision step 510 to reduce current memory utilisation consumed by previously captured images. If this option is not selected, then the process 516 is directed in accordance with a NO arrow back to the initial quality selection step 500. If, however, the user elects to reduce current memory utilisation, and accordingly recover some of that utilised memory, then the process 516 proceeds in accordance with a YES arrow to an image re-compression and storage step 512. Memory associated with one or more of the already stored images is released for use at this stage by discarding selected elements of stored data associated with the selected images. In a following memory management step 514, the released memory is incorporated into an "available memory" store, and the process 516 is again directed to the initial quality selection step 500.

Figure 6:
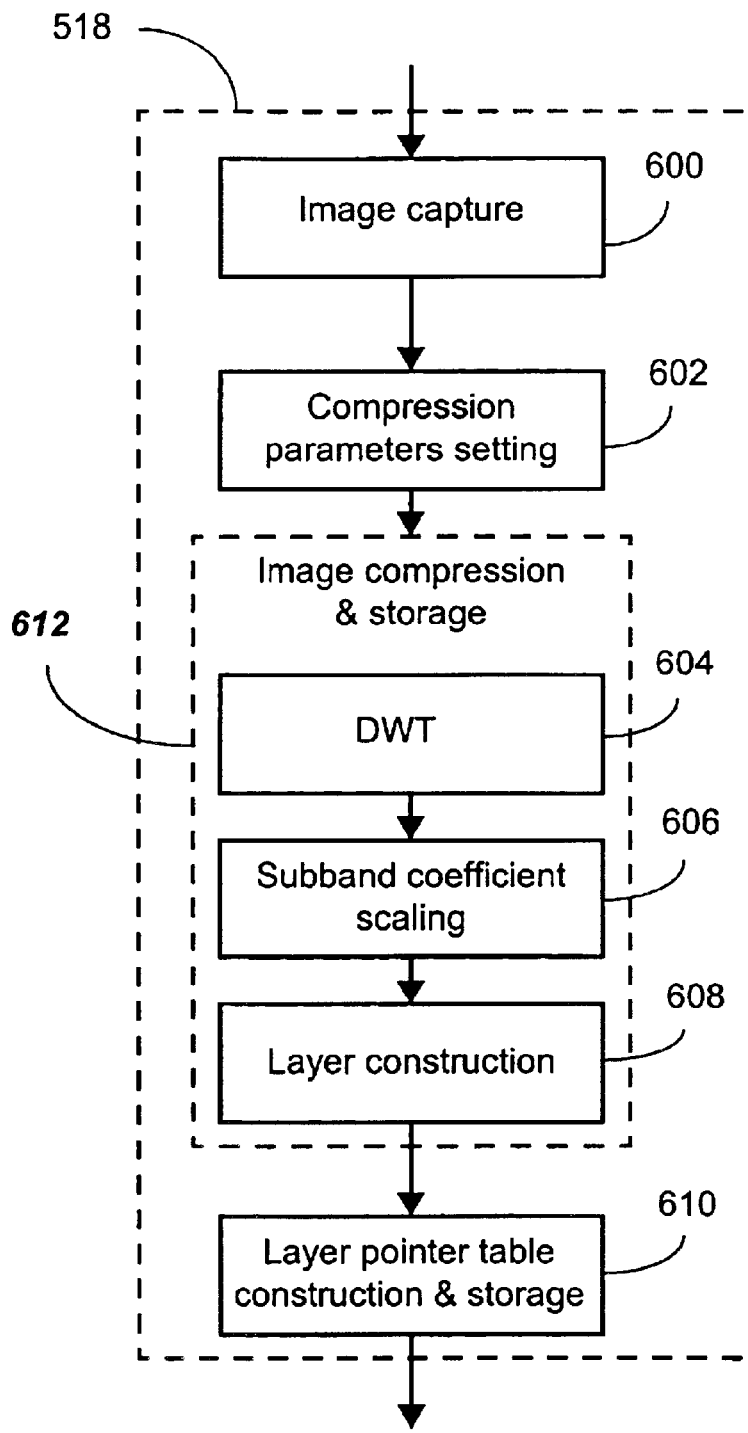
FIG. 6 illustrates a portion of the process flow of FIG. 5, in more detail.

FIG. 6, shows a flow diagram 518 including an encoding process in accordance with the preferred embodiment of the present invention. In a capture step 600, a digital image is captured by the digital camera. A two-stage parameter setting step 602 for the encoding process is then performed, the first stage comprising an initialisation stage relating to number of layers and progression order, and the second stage relating to setting other parameters. In the first initialisation stage, as noted, encoding parameters for the number of layers and the progression order are set.

In the preferred embodiment, the number of layers is set at 5 and the progression order selected is the layer progressive mode. In the second stage of step 602, other image compression parameters are set. In the preferred embodiment the number of DWT decomposition levels is set at four (giving five resolution levels), the code-block size is set to 32,the image is tiled with one tile (ie tiling is not used), the DWT filter pair is set to the reversible 5/3 filter pair, the width and height of the reference grid is set to the width and height of the input image, and the quantization style is set to "no quantization". The entropy coding parameters are set as follows: (i) no selective arithmetic coding bypass, (ii) no reset of context probabilities on coding pass boundaries, (iii) no termination on each coding pass, (iv) no vertically stripe causal context, and (v) predictable termination.

In a step 612, the image is compressed in accordance with the JPEG2000 standard, using the aforementioned image compression parameters, and then stored in the camera memory. Image compression is performed by taking a DWT of the original image in a step 604, and then entropy coding the subbands in a step 606, and performing layer construction in a step 608. In alternate embodiments some or all of the image compression parameters can be permanently fixed and thus initialisation would not be required on a per image basis. The selected five image layers are constructed so that the reconstructed image quality ranges from low quality to lossless quality (ie reconstructed without loss) corresponding to 1 to 5 layers respectively. The layers are constructed as described in the following paragraphs.

The coefficients in each subband are operated on in the step 606, in order to conceptually scale the sub-bands up (or down), by a number of bits as required to approximate, as much as is possible by bit-level scaling, an orthogonal sub-band transform. An orthogonal transform, insofar as the present scaling is concerned, ensures that substantially no "quantization error amplification" occurs in the decoding process. Each subband generally requires scaling by a different amount. The conceptual scaling is achieved by adjusting "bit precision" according to an amount of required scaling, so that when referring to a coding bit precision, the bit precision is referred to the associated orthogonal scaling. The term "bit-precision of n" means taking into account bits n and up, where bit n is the nth least significant bit. Accordingly, for example, a bit-precision of 3 is more precise than a bit-precision of 4.Thus, if a subband is to be conceptually scaled up by 2 bits (eg from say 8 bit resolution to 10 bit resolution), then a bit precision of 4 is taken to mean that information about the $6^{th}$ and higher bits of each coefficient (ie the 4 most significant bits) in the given subband is coded. As another example, if a subband is to be scaled up by 0 bits, (eg if the subband remains at say 8 bit precision), a bit precision of 4 means that information about the $4^{th}$ and higher bits of each coefficient (ie the 4 most significant bits) in the given subband is coded. The bits are indexed beginning from the $0^{th}$ bit (which is the Least Significant Bit ie LSB). Accordingly, a bit precision of 4 (relative to a scaling of 0 bits) means that bit 4 and higher bits for each coefficient can be reconstructed exactly from the compressed bit-stream, while bits 0, 1, 2, and 3 are ignored, and thus unavailable to a compressed image decoder.

In the layer construction step 608, a first layer is constructed by coding each subband (or code-block therein) to a bit-precision of 4.The second layer is constructed by coding the next bit plane for each code-block, bringing the bit precision to 3.The third layer is constructed by coding the next sub-pass for each code-block ie the first sub-pass in bit plane 2 (relative to the subband scaling). The fourth layer is constructed by coding the next two-sub passes, bringing the bit precision to 2.The $5^{th}$ layer is then constructed by coding all remaining bit planes for each code-block to give a lossless representation of the original image, in accordance with the original image taken by the digital camera).

In the following step 610, a layer pointer table is stored in the camera memory device. This table contains information about pointers to compressed image elements, and in particular, the location where each (subsequent) layer begins. The first entry in the table holds the number of bytes contained in the code-stream that includes all information up to and including the first layer. The second entry contains the number of bytes contained in the code-stream that includes all information up to and including the second layer (and hence includes the first layer) and so on. In the preferred embodiment the layer pointer table is stored separately from the compressed image. In alternate embodiments it can be stored in a comment and extension marker segment inside the JPEG2000 compressed image. Alternatively the layer pointer table can be extended to include pointer information for all packets. Thus a given packet representing a given layer for a given resolution and given component can be easily identified in the compressed image bit-stream. This information can also be stored in a PLM marker segment (an optional packet length marker segment for the main header) inside a JPEG2000 compressed image code-stream.

Figure 7:
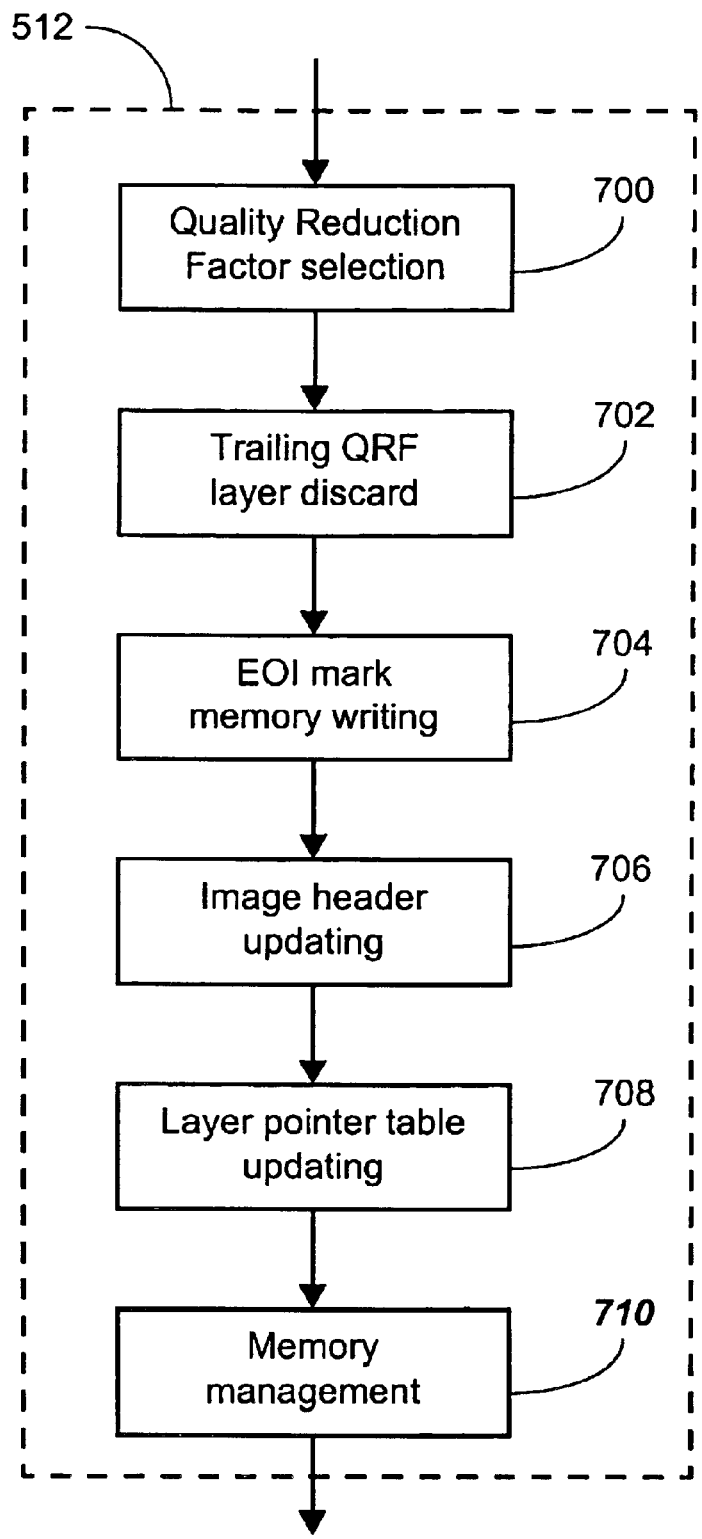
FIG. 7 shows a process flow for recovery of memory in accordance with the preferred embodiment.

FIG. 7 shows recovery of memory in accordance with the preferred embodiment, performed by a preferred embodiment of the recompressor referred to in step 512 in relation to FIG. 5. The recompression process 512 offers efficient recompression of images stored on the digital camera. In a step 700 a quality reduction factor (QRF) is selected. In the preferred embodiment, the QRF is set to either 1, 2, 3 or 4. In a step 702, the trailing layers, containing the least significant quality information by virtue of being related to the least significant bit-plane data, are discarded from the compressed image code-stream. (For example, if the QRF is 1, then the last layer, ie layer 5 is discarded. If the QRF is 2, then the trailing two layers, layers 4 and 5, are discarded and so on. For example, a QRF of 1 applied to the layering example in [1] above, would result in the second layer comprising packets 7 to 12 being discarded). In other words, the packets for all the components, and all the resolutions, for the aforementioned discarded layers of the compressed image are discarded. These packets form the last, or trailing part of the compressed image code-stream, and are found using the layer pointer table. In a next step 704, an end of image (EOI) marker is written after the last retained layer (ie after the last packet of the last retained layer) to indicate the new end of the compressed image. Discarding the other packets is achieved by simply indicating to the memory system manager that the space taken by these trailing packets, while accounting for the new EOI marker, is now free memory.

At a next step 706, a compressed image header is updated to reflect the new number of layers. For example if the selected QRF is 1,then the number of layers indicated in the compressed image header is updated to be 4.If the selected QRF is 2,then the number of layers is updated to be 3 and so on. The layer pointer table is updated in a step 708. A memory management step 710 performs any ancillary memory management functions which may be required.

An alternate embodiment 512 of the recompressor process is described with reference to FIG. 8. In a step 800, a Resolution Reduction Factor (RRF) is selected, permissible values being either 1, 2, 3 or 4.In a step 802 the packets corresponding to the highest RRF resolution levels are discarded (for example, an RRF of 1 applied to [1] above would result in packets 4 to 6 and 10 to 12 being discarded). The compressed image header is updated in a following step 804, in order to reflect the resolution levels discarded in Step 802. If the RRF selected is 1,then the number of DWT levels is updated to be 4, recalling that the original image was compressed with 5 levels. If the selected RRF is 2, then the number of DWT levels is updated to be 3 and so on. The image height and width is also updated to reflect the discarded resolution levels.

In a step 806, the compressed image is rewritten, in order to account for discarded packets, in layer progressive mode, by contiguously rewriting those packets that have not been discarded. The packet order is thus the same as the original order, where some packets, namely those corresponding to discarded resolution levels, are no longer present. The packets are identified using the layer pointer table. The rewritten packets are preferably written beginning at the same location as that for the first packet of the original compressed image and are rewritten, as noted, in a contiguous manner. After the last retained packet is rewritten, an EOI marker indicating the end of the compressed code-stream is written in a step 808. In a step 810, the layer pointer table is updated, after which the memory freed by discarding the packets is indicated to the memory system manager in a step 812.

Figure 8:
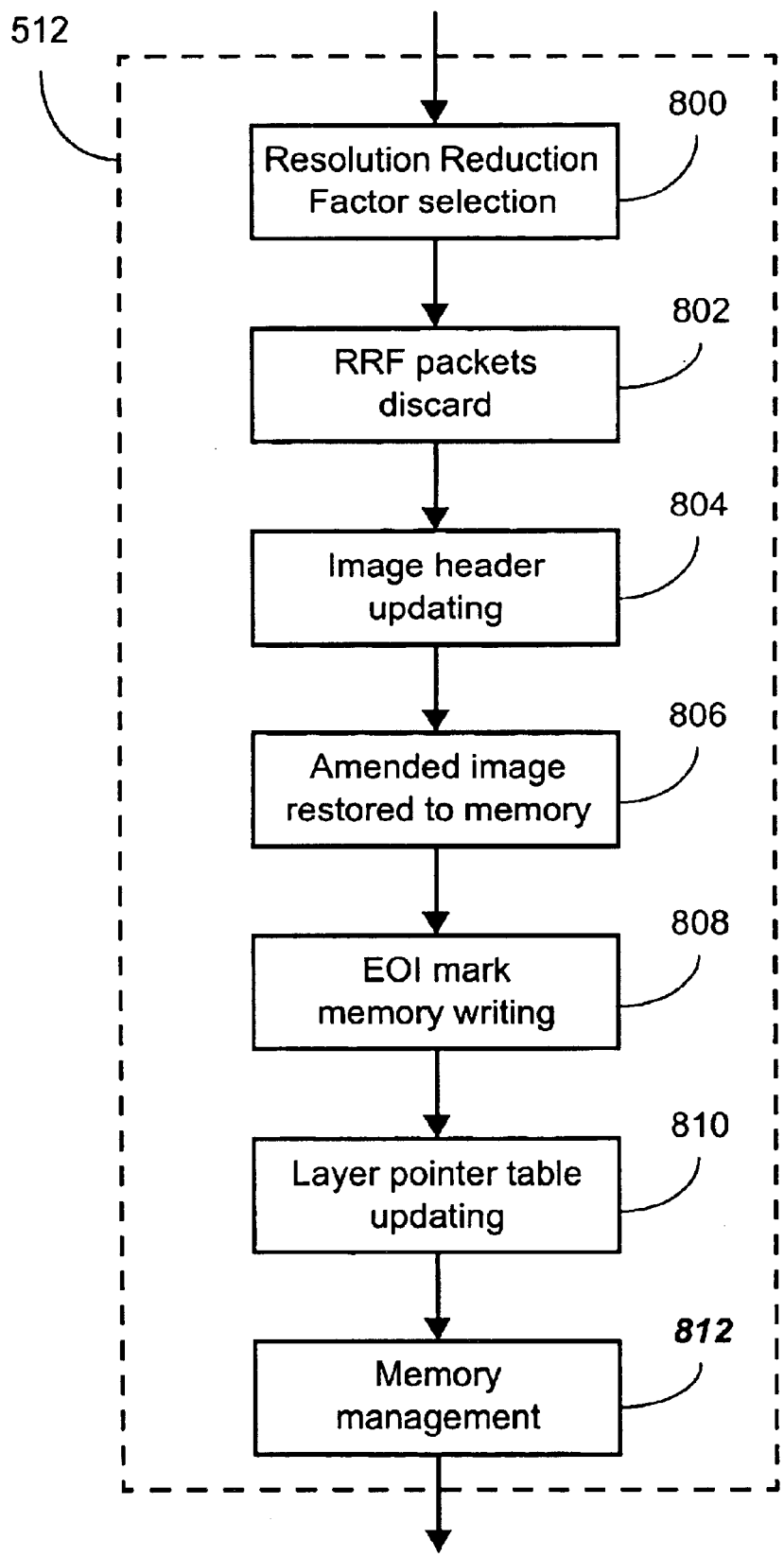
FIG. 8 depicts a provess flow for recovery of memory in accordance with an alternate embodiment.

In a further embodiment, process 512, described in relation to FIGS. 7 and 8 respectively, can be combined. In this way, the resolution and quality of an image can be reduced in order to free memory, and the quality of an image can be reduced in separate steps at different times. For example the image can be recompressed from 5 to 3 layers and then recompressed again from 3 to 2 layers at some later stage.

The method of recovering memory capacity in a digital camera can preferably be implemented in dedicated hardware such as one or more integrated circuits performing the functions or sub functions of recovering memory capacity in a digital camera. Such dedicated hardware can include graphic processors, digital signal processors, or one or more microprocessors and associated memories.

Figure 9:
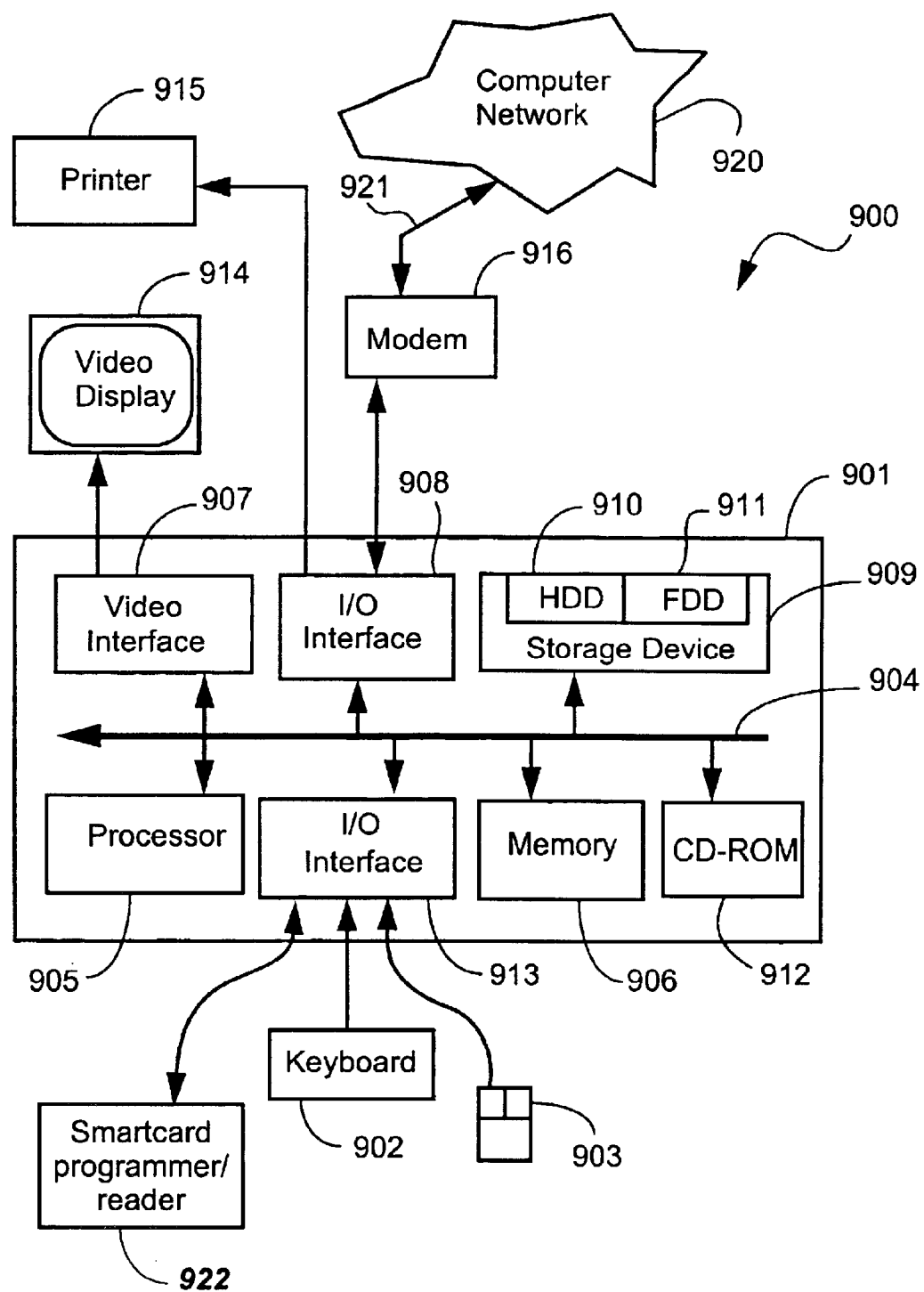
FIG. 9 is a schematic block diagram of a general purpose computer upon which the preferred embodiment of the present invention can be practiced.

The method of recovering image memory capacity can also be practiced using a conventional general-purpose computer system 900, such as that shown in FIG. 9 wherein the processes of FIGS. 5–8 may be implemented as software, such as an application program executing within the computer system 900. In particular, the steps of the method of recovering image memory capacity are effected by instructions in the software that are carried out by the computer. The software may be divided into two separate parts; one part for carrying out the method of recovering image memory capacity, and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for recovering image memory capacity in accordance with the embodiments of the invention.

The computer system 900 comprises a computer module 901, input devices such as a keyboard 902 and mouse 903, output devices including a printer 915 and a display device 914. A Modulator-Demodulator (Modem) transceiver device 916 is used by the computer module 901 for communicating to and from a communications network 920, for example connectable via a telephone line 921 or other functional medium. The modem 916 can be used to obtain access to the Internet, and other network systems, such as a Local Area Network (LAN) or a Wide Area Network (WAN).

The computer module 901 typically includes at least one processor unit 905, a memory unit 906, for example formed from semiconductor random access memory (RAM) and read only memory (ROM), input/output (I/O) interfaces including a video interface 907, and an I/O interface 913 for the keyboard 902 and mouse 903 and optionally a joystick (not illustrated), and an interface 908 for the modem 916. A storage device 909 is provided and typically includes a hard disk drive 910 and a floppy disk drive 911. A magnetic tape drive (not illustrated) may also be used. A CD-ROM drive 912 is typically provided as a non-volatile source of data. The components 905 to 913 of the computer module 901, typically communicate via an interconnected bus 904 and in a manner which results in a conventional mode of operation of the computer system 900 known to those in the relevant art. Examples of computers on which the embodiments can be practised include IBM-PC's and compatibles, Sun Sparcstations or alike computer systems evolved therefrom.

Typically, the application program of the preferred embodiment is resident on the hard disk drive 910 and read and controlled in its execution by the processor 905. Intermediate storage of the program and any data fetched from the network 920 may be accomplished using the semiconductor memory 906, possibly in concert with the hard disk drive 910. In some instances, the application program may be supplied to the user encoded on a CD-ROM or floppy disk and read via the corresponding drive 912 or 911, or alternatively may be read by the user from the network 920 via the modem device 916. Still further, the software can also be loaded into the computer system 900 from other computer readable medium including magnetic tape, a ROM or integrated circuit, a magneto-optical disk, a radio or infra-red transmission channel between the computer module 901 and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

INDUSTRIAL APPLICABILITY

It is apparent from the above that the embodiment(s) of the invention are applicable to the image data processing industries.

The foregoing describes only some embodiments of the present invention, and modifications and/or changes can be made thereto without departing from the scope and spirit of the invention, the embodiments being illustrative and not restrictive. For example the resolution-layer progression order of the pending JPEG2000 image compression standard can also be used. Furthermore, alternative image compression techniques that provide segmentation of the compressed bit-stream into quality and resolution progressive parts can also be used.

What is claimed is:

1. A method of recovering image memory capacity, in relation to an image which has been encoded according to a layer progressive mode into L layers, L being an integer value greater than unity, the L layers being stored in an image memory having a limited capacity, said method comprising the steps of:

defining a Quality Reduction Factor;

identifying at least one of the L layers corresponding to the Quality Reduction Factor; and discarding the at least one of the L layers in progressive order in accordance with the Quality Reduction Factor, thereby recovering the memory capacity.

2. A method according to claim 1, wherein the Quality Reduction Factor is a positive integer value.

3. A method according to claim 1, further comprising, prior to said defining step, the step of:

determining address information associated with the L layers, wherein said identifying step is performed in accordance with the address information.

4. A method according to claim 1, wherein the encoding conforms substantially with a JPEG2000 standard.

5. A method according to claim 1, wherein said discarding step further comprises the steps of:

writing an End Of Image marker after a last retained layer; and indicating to a memory management system that the memory capacity has been recovered.

6. A method according to claim 3 wherein the address information is dependent upon a layer pointer table.

7. A method according to claim 1, wherein L is 5, and said encoding comprises the sub-steps of:

encoding Discrete Wavelet Transform coefficients for layer 1 to a bit-precision of 4;

encoding Discrete Wavelet Transform coefficients for layer 2 to a bit-precision of 3;

encoding Discrete Wavelet Transform coefficients for layer 3 to a bit precision up to and including the first sub-pass at bit plane 2;

encoding Discrete Wavelet Transform coefficients for layer 4 to a bit-precision of 2; and encoding Discrete Wavelet Transform coefficients for layer 5 losslessly.

8. A method of recovering image memory capacity, in relation to an image which has been encoded according to a resolution progressive mode into R resolution levels, R being an integer value greater than unity, the R resolution levels being stored in an image memory having a limited capacity; the method comprising the steps of:

defining a Resolution Reduction Factor;

identifying at least one of the resolution levels, corresponding to the Resolution Reduction Factor; and discarding the at least one of the resolution levels in progressive order, in accordance with the Resolution Reduction Factor, thereby recovering the memory capacity.

9. A method according to claim 8, wherein the Resolution Reduction Factor is a positive integer value.

10. A method according to claim 8, further comprising, prior to said defining step, the step of:

determining address information associated with the R resolution levels, wherein said identifying step is performed in accordance with the address information.

11. A method according to claim 8, wherein the encoding conforms substantially with a JPEG2000 standard.

12. A method according to claim 8, wherein said discarding step further comprises the steps of:

rewriting retained resolution levels, thereby maintaining a resolution level order; and terminating rewritten levels so formed with an End Of Image marker.

13. A method according to claim 12, wherein said rewriting step comprises the steps of:

rewriting retained resolution levels beginning from a same location as resolution levels for the original encoded image; and indicating to a memory management system that memory capacity following the End Of Image marker has been recovered.

14. A method according to claim 3 or 10, wherein the address information is dependent upon information stored in a Packet Length Marker segment.

15. A method of recovering image memory capacity, in relation to an image which has been encoded to produce a plurality of corresponding encoded image elements arranged in a progressive order, the encoded image elements being stored in an image memory having a limited capacity, said method comprising the steps of:
    defining a reduction factor;
    identifying at least one of the encoded image elements corresponding to the reduction factor; and
    discarding the at least one encoded image element in the progressive order, thereby recovering the memory capacity.

16. A method according to claim 15, further comprising, prior to said defining step, the step of:
    determining address information associated with the encoded image elements, wherein said identifying step is performed in accordance with the address information.

17. An apparatus for recovering image memory capacity, in relation to an image which has been encoded according to a layer progressive mode into L layers, L being an integer value greater than unity, the L layers being stored in an image memory having a limited capacity; said apparatus comprising:
    Quality Reduction Defining means for defining a Quality Reduction Factor;
    identifying means for identifying at least one of the L layers corresponding to the Quality Reduction Factor; and
    discarding means for discarding the at least one of the L layers in the progressive order in accordance with the Quality Reduction Factor, thereby recovering the memory capacity.

18. An apparatus according to claim 17, wherein the Quality Reduction Factor is a positive integer value.

19. An apparatus according to claim 17, further comprising:
    address determining means for determining address information associated with the L layers, wherein said identifying means operates in accordance with the address information.

20. An apparatus according to claim 17, wherein the encoding conforms substantially with a JPEG2000 standard.

21. An apparatus according to claim 17, wherein said discarding means comprises:
    marker writing means for writing an End Of Image marker after a last retained layer; and
    indicating means for indicating to a memory management system that the memory capacity has been recovered.

22. An apparatus according to claim 19, wherein the address information is dependent upon a layer pointer table.

23. An apparatus according to claim 17, wherein L is 5, and said encoding comprises the sub-steps of:
    encoding Discrete Wavelet Transform coefficients for layer 1 to a bit-precision of 4;
    encoding Discrete Wavelet Transform coefficients for layer 2 to a bit-precision of 3;
    encoding Discrete Wavelet Transform coefficients for layer 3 to a bit precision up to and including the first sub-pass at bit plane 2;
    encoding Discrete Wavelet Transform coefficients for layer 4 to a bit-precision of 2; and
    encoding Discrete Wavelet Transform coefficients for layer 5 losslessly.

24. An apparatus for recovering image memory capacity, in relation to an image which has been encoded according to a resolution progressive mode into R resolution levels, R being an integer value greater than unity, the R resolution levels being stored in an image memory having a limited capacity, the apparatus comprising:
    Resolution Reduction Factor defining means for defining a Resolution Reduction Factor;
    identifying means for identifying at least one of the resolution levels, corresponding to the Resolution Reduction Factor; and
    discarding means for discarding the at least one of the resolution levels in a progressive order, in accordance with the Resolution Reduction Factor, thereby recovering the memory capacity.

25. An apparatus according to claim 24, wherein the Resolution Reduction Factor is a positive integer value.

26. An apparatus according to claim 24, further comprising:
    address determining means for determining address information associated with the R resolution levels, wherein said identifying means operates in accordance with the address information.

27. An apparatus according to claim 24, wherein the encoding conforms substantially with JPEG2000 standard.

28. An apparatus according to claim 24, wherein said discarding means comprises:
    rewriting means for rewriting retained resolution levels, thereby maintaining a resolution level sequence order; and
    terminating means for terminating rewritten resolution levels so formed with an End Of Image marker.

29. An apparatus according to claim 28, wherein said rewriting means comprises:
    resolution level rewriting means for rewriting retained resolution levels beginning from a same location as resolution levels for the original encoded image; and
    indicating means for indicating to a memory management system that memory capacity following the End Of Image marker has been recovered.

30. An apparatus according to claim 19 or 26, wherein the address information is dependent upon information stored in a Packet Length Marker segment.

31. An apparatus for recovering image memory capacity, in relation to an image which has been encoded to produce a plurality of corresponding encoded image elements arranged in a progressive order, the encoded image elements being stored in an image memory having a limited capacity, said apparatus comprising:
    defining means for defining a reduction factor;
    identifying means for identifying at least one of the encoded image elements corresponding to the reduction factor; and
    discarding means for discarding the at least one encoded image element in the progressive order, thereby recovering the memory capacity.

32. An apparatus according to claim 31, wherein said defining means comprises:
    address information determining means for determining address information associated with the encoded image elements, said identifying step being performed in accordance with the address information.

33. A computer readable memory medium for storing a program for an apparatus for recovering image memory capacity, in relation to an image which has been encoded according to a layer progressive mode into L layers, L being an integer value greater than unity, the L layers being stored in an image memory having a limited capacity, said program comprising:

code for a defining step, of defining a Quality Reduction Factor;

code for an identifying step, of identifying at least one of the L layers corresponding to the Quality Reduction Factor; and code for a discarding step, of discarding the at least one of the L layers in progressive order in accordance with the Quality Reduction Factor, thereby recovering the memory capacity.

34. A computer readable memory according to claim 33, wherein the Quality Reduction Factor is a positive integer value.

35. A computer readable memory medium according to claim 33, further comprising:

code for a determining step, of determining address information associated with the L layers, wherein said code for said identifying step operates in accordance with the address information.

36. A computer readable memory medium according to claim 33, wherein the encoding conforms substantially with a JPEG2000 standard.

37. A computer readable memory medium according to claim 33, wherein said code for said discarding step comprises:

code for a writing step, of writing an End Of Image marker after a last retained layer; and code for an indicating step, of indicating to a memory management system that the memory capacity has been recovered.

38. A computer readable memory medium according to claim 35, wherein the address information is dependent upon a layer pointer table.

39. A computer readable memory medium according to claim 33, wherein L is 5, and said encoding comprises sub-steps of:

encoding Discrete Wavelet Transform coefficients for layer 1 to a bit-precision of 4;

encoding Discrete Wavelet Transform coefficients for layer 2 to a bit-precision of 3;

encoding Discrete Wavelet Transform coefficients for layer 3 to a bit precision up to and including the first sub-pass at bit plane 2;

encoding Discrete Wavelet Transform coefficients for layer 4 to a bit-precision of 2; and encoding Discrete Wavelet Transform coefficients for layer 5 losslessly.

40. A computer readable memory medium for storing a program for apparatus for recovering image memory capacity, in relation to an image which has been encoded according to a resolution progressive mode into R resolution levels, R being an integer value greater than unity, the R resolution levels being stored in an image memory having a limited capacity, the program comprising:

code for a defining step, of defining a Resolution Reduction Factor;

code for an identifying step, of identifying at least one of the resolution levels, corresponding to the Resolution Reduction Factor; and code for a discarding step, of discarding the at least one of the resolution levels in progressive order, in accordance with the Resolution Reduction Factor, thereby recovering the memory capacity.

41. A computer readable memory medium according to claim 40, wherein the Resolution Reduction Factor is a positive integer value.

42. A computer readable memory medium in accordance with claim 40, further comprising:

code for a determining step, of determining address information associated with the R resolution levels, wherein said code for said identifying step operates in accordance with the address information.

43. A computer readable memory medium according to claim 40, wherein the encoding conforms substantially with a JPEG2000 standard.

44. A computer readable memory medium according to claim 40, wherein said code for said discarding step comprises:

code for a rewriting step, of rewriting retained resolution levels, thereby maintaining a resolution level sequence order; and code for a terminating step, of terminating rewritten resolution levels so formed with an End Of Image marker.

45. A computer readable memory medium according to claim 44, wherein said code for said rewriting step comprises:

code for a retained resolution level rewriting step, of rewriting retained resolution levels beginning from a same location as resolution levels for the original encoded image; and code for an indicating step, of indicating to a memory management system that memory capacity following the End Of Image marker has been recovered.

46. A computer readable memory medium according to either claim 35 or 42, wherein the address information is dependent upon information stored in a Packet Length Marker segment.

47. A computer readable memory medium for storing a program for an apparatus for recovering image memory capacity, in relation to an image which has been encoded to produce a plurality of corresponding encoded image elements arranged in a progressive order, said encoded image elements being stored in an image memory having a limited capacity, said program comprising:

code for a defining step, of defining a reduction factor;

code for an identifying step, of identifying at least one of the encoded image elements corresponding to the reduction factor; and code for a discarding step, of discarding the at least one encoded image element in the progressive order, thereby recovering the memory capacity.

48. A computer readable memory medium according to claim 47, further comprising:

code for a determining step, of determining address information associated with the encoded image elements, wherein said identifying step is performed in accordance with the address information.

* * * * *

UNITED STATES PATENT AND TRADEMARK OFFICE
CERTIFICATE OF CORRECTION

| | | |
|---|---|---|
| PATENT NO. | : 6,999,626 B2 | |
| APPLICATION NO. | : 09/791592 | |
| DATED | : February 14, 2006 | |
| INVENTOR(S) | : James Philip Andrew | |

It is certified that error appears in the above-identified patent and that said Letters Patent is hereby corrected as shown below:

ON THE TITLE PAGE [56] REFERENCES CITED:

U.S. Patent Documents, insert: --5,761,345   6/98   Saito et al.
5,825,934   10/98   Ohsawa   "; and
"5,867,602   2/1999   Zandi et al." should read
--5,876,602   2/1999 Zandi et al.--.

SHEET 5:

Fig. 5, "utilisation" should read --utilization--.

COLUMN 2:

Line 64, "factor" should read --factor;--.

COLUMN 5:

Line 5, "k < 12.In" should read --k < 12.  In--; and
Line 32, "eg 248," should read --e.g., 248,--.

COLUMN 6:

Line 9, "summarising," should read --summarizing,--;
Line 22, "ie" should read --i.e.,--;
Line 39, "2,the" should read --2, the--; and
Line 41, "3,the" should read --3, the--.

COLUMN 7:

Line 35, "utilisation" should read --utilization--;
Line 39, "utilisation" should read --utilization,--;
Line 40, "utilised" should read --utilized--;
Line 54, "initialisation" should read --initialization--;
Line 56, "initialisation" should read --initialization--; and
Line 65, "32,the" should read --32, the--.

UNITED STATES PATENT AND TRADEMARK OFFICE
CERTIFICATE OF CORRECTION

PATENT NO. : 6,999,626 B2
APPLICATION NO. : 09/791592
DATED : February 14, 2006
INVENTOR(S) : James Philip Andrew It is certified that error appears in the above-identified patent and that said Letters Patent is hereby corrected as shown below:

COLUMN 8:

Line 15, "initialisation" should read --initialization--;
Line 55, "4.The" should read --4. The--;
Line 57, "3.The" should read --3. The--;
Line 58, "ie" should read --i.e.,--; and
Line 61, "2.The" should read --2. The--.

COLUMN 9:

Line 30, "ie" should read --i.e.,--;
Line 50, "4.If" should read --4. If--;
Line 51, "2,then" should read --2, then--; and
Line 58, "4.In" should read --4. In--.

COLUMN 12:

Line 14, "claim 3" should read --claim 3,--.

Signed and Sealed this

Twenty-fourth Day of June, 2008

JON W. DUDAS
*Director of the United States Patent and Trademark Office*